E. R. DURGIN.
EYEGLASS MOUNTING.
APPLICATION FILED FEB. 27, 1919.

1,347,998.

Patented July 27, 1920.

INVENTOR
Edgar R. Durgin
BY
Cyrus N. Anderson
ATTORNEY.

UNITED STATES PATENT OFFICE.

EDGAR R. DURGIN, OF NEWARK, NEW JERSEY, ASSIGNOR TO NEW JERSEY OPTICAL CO., OF NEWARK, NEW JERSEY, A CORPORATION OF NEW JERSEY.

EYEGLASS-MOUNTING.

1,347,998.     Specification of Letters Patent.     Patented July 27, 1920.

Application filed February 27, 1919. Serial No. 279,560.

*To all whom it may concern:*

Be it known that I, EDGAR R. DURGIN, a citizen of the United States, and a resident of Newark, in the county of Essex and State of New Jersey, have invented an Improvement in Eyeglass-Mountings, of which the following is a specification.

My invention relates to improvements in eyeglass mountings, and it has for one of its objects to provide a mounting of a construction such that gold filled parts may be satisfactorily used.

Ordinarily in the construction of gold filled eyeglass mountings, gold filled flat stock is used. The flat parts entering into the construction are cut from a plate, the opposite sides of which are plated upon copper or other metal which corrodes or oxidizes by reason of its contact with the face or by reason of being exposed to the atmosphere. Such oxidation when it takes place upon the bridge of the mounting is objectionable because of the amount of the oxidizable portion which is exposed and which is apt to contact with the nose.

In the construction embodying my invention, I have provided a spring bridge which is round in cross section, but the nose gripping members are of the ordinary flat stock, because such stock is preferable for the nose gripping members. The oxidizable portion of the metal which is exposed upon the edges of these parts is small and the fact that the same is exposed does not constitute a serious objection, hence flat stock may be used for the nose gripping members to produce a satisfactory construction.

In the carrying out of my invention, the spring bridge and nose gripping members are constructed of separate parts and each is provided with lateral projections which are joined together and these in turn are secured to the straps which are adapted to engage the eye rims within which the lenses are held, or, if preferred, they may engage with and be connected in known manner directly to the lenses themselves. The advantage of this construction is that it enables the use of nose gripping members of various forms and of different kinds of construction.

In order that my invention may be readily understood and its practical advantages more fully appreciated, reference should be had to the accompanying drawing in which I have illustrated a preferred form of embodiment of my invention. It will be understood, however, that the same is susceptible of embodiment in other forms of construction within the scope of the claims.

Figure 1:
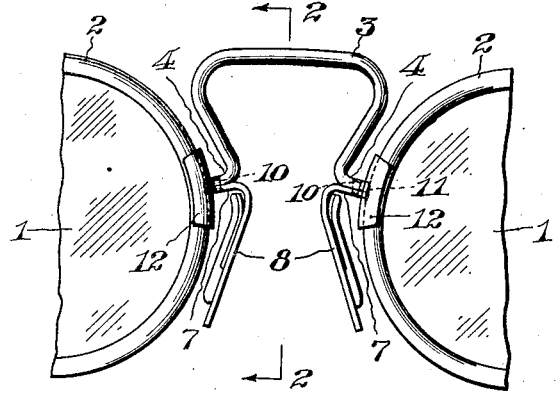
Figure 1 is a view in front elevation of a pair of eyeglasses having mountings constructed in accordance with my invention, the outer portions of both lenses and eye rims being broken away.
Figure 2:
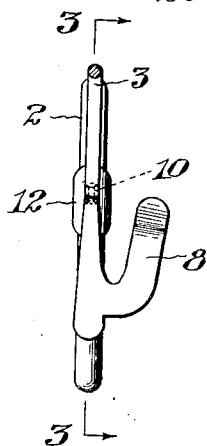
Fig. 2 is a transverse section taken on the line 2—2 of Fig. 1.
Figure 3:
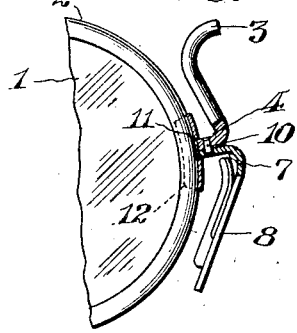
Fig. 3 is a view partly in front elevation and in vertical section taken on the line 3—3 of Fig. 2.

Referring to the drawing: 1 designates the lenses of a pair of eyeglasses and 2 the rims therefor. 3 designates a bridge which, in the construction shown, is circular in cross section, although it will be understood that a cross sectional view of the same may present a polygonal contour or shape. The bridge is of the usual well known shape and its opposite ends are bent laterally as indicated at 4. The lower or bottom sides of these laterally extending projections 4 are flattened so as to fit against the flat upper surfaces of the outward laterally extending projections 7 in which the upper ends of the nose gripping members 8 terminate. These laterally extending projections 4 and 7 may be secured together by rivets 10, as shown, or they may be soldered together if preferred. They may be also both riveted and soldered. The outer ends of these projections extend through openings 11 at the centers of the straps 12. The extreme outer ends of these projections are up set as indicated in order to secure the straps thereto. In addition to being so up set, the straps also preferably should be further secured by being soldered to the ends of said outward laterally extending projections 4 and 7.

By constructing the spring bridge and nose gripping members in separate parts as shown and by providing each of the said parts with laterally and outwardly extending projections, as shown, it is apparent that the spring bridge may be constructed of round or equivalent stock and that the nose gripping members may be constructed of flat stock. As above indicated, it is desirable that the spring bridge shall be constructed of round or similar equivalent stock, in order that the entire surface thereof may be plated or covered with gold or other non-corrodible metal. As heretofore constructed, the bridge parts have been formed by cutting the same from flat stock with the result that at the opposite edges the base corrodible metal is exposed, and oxidizes and becomes objectionable.

By my invention I have provided a construction of gold filled eyeglass mounting which may be cheaply manufactured and by reason of the simplicity of the construction the parts entering into the construction of the mounting may be readily and quickly assembled and connected together. As already indicated my invention provides for the interchangeability of nose gripping members; that is to say, any character of nose gripping member desired may be attached to the spring bridge.

I claim:

1. In an eyeglass mounting the combination of a bridge which is circular in cross section, the said bridge being bowed and having outwardly extending projections at its opposite ends, nose gripping members terminating in outwardly extending projections at their upper ends, means for securing the projections of the bridge and of the nose gripping members respectively together, straps having operative connection with the lenses of the eyeglasses, the outer ends of said projections being secured directly to the said straps.

2. In an eyeglass mounting, the combination of a bridge having outwardly extending projections at its opposite ends, nose gripping members having laterally and outwardly extending projections at their upper ends in contact with the projections upon said bridge, the said contacting projections being secured directly together, and straps secured directly to the outer ends of said projections.

3. In an eyeglass mounting, the combination of a bridge having outwardly extending projections at its opposite ends, nose gripping members having laterally and outwardly extending projections at their upper ends in contact with and secured to the projections upon said bridge, and straps having holes extending therethrough through which the said projections extend, the said projections being fastened to said straps.

4. In an eyeglass mounting the combination of a bridge having outwardly extending projections at its opposite ends, nose gripping members having outwardly extending projections at their upper ends which projections are secured to the projections upon said bridge, and straps each having a hole extending therethrough through which the said projections extend, the outer ends of said projections being upset to secure the same to the straps, substantially as described.

In testimony that I claim the foregoing as my invention I have hereunto set my hand this 26th day of February, A. D. 1919.

EDGAR R. DURGIN.